US008676910B2

(12) United States Patent
Wang et al.

(10) Patent No.: US 8,676,910 B2
(45) Date of Patent: Mar. 18, 2014

(54) METHOD, SERVER, CLIENT AND SYSTEM FOR NETWORK PLATFORM INTERACTION

(75) Inventors: Xuxin Wang, Guangdong (CN); Dong Wang, Guangdong (CN); Xianwen Chen, Guangdong (CN)

(73) Assignee: Tencent Technology (Shenzhen) Company Limited, Futian District, Shenzhen, Guandong (CN)

( * ) Notice: Subject to any disclaimer, the term of this patent is extended or adjusted under 35 U.S.C. 154(b) by 0 days.

(21) Appl. No.: 13/582,048

(22) PCT Filed: Jan. 28, 2011

(86) PCT No.: PCT/CN2011/070768
§ 371 (c)(1),
(2), (4) Date: Nov. 8, 2012

(87) PCT Pub. No.: WO2011/107002
PCT Pub. Date: Sep. 9, 2011

(65) Prior Publication Data
US 2013/0060872 A1    Mar. 7, 2013

(30) Foreign Application Priority Data
Mar. 3, 2010  (CN) .......................... 2010 1 0122665

(51) Int. Cl.
*G06F 15/16*    (2006.01)
*G06F 3/048*    (2013.01)

(52) U.S. Cl.
USPC ........................................ 709/206; 715/769

(58) Field of Classification Search
USPC ........................ 709/201–207; 715/763–769
See application file for complete search history.

(56) References Cited

U.S. PATENT DOCUMENTS

| 8,055,766 | B2 * | 11/2011 | Bloebaum et al. | 709/224 |
| 8,401,009 | B1 * | 3/2013 | Dorsey et al. | 370/389 |
| 2009/0210483 | A1 * | 8/2009 | Pierce et al. | 709/203 |
| 2009/0259959 | A1 | 10/2009 | Grotjon et al. | |
| 2010/0122196 | A1 * | 5/2010 | Wetzer et al. | 715/769 |
| 2011/0072375 | A1 * | 3/2011 | Victor | 715/765 |

FOREIGN PATENT DOCUMENTS

| CN | 101106609 A | 1/2008 |
| CN | 101227652 A | 7/2008 |
| CN | 101627349 A | 1/2010 |

* cited by examiner

*Primary Examiner* — Chirag R Patel
(74) *Attorney, Agent, or Firm* — Blakely Sokoloff Taylor & Zafman (57) ABSTRACT

The present invention discloses a method, a server, a client and a system for network platform interaction which belong to the technical field of communication. The method comprises steps wherein: an intermediate platform detects a location event which includes selecting a contact person on a first platform and locating the contact person at a certain position; the intermediate platform acquires the information about the contact from the first platform, determines a corresponding second platform according to the position, and sends the location event to the second platform; the second platform analyzes the location event to acquire the related data of the position, acquires the contact person's information from the intermediate platform, and executes corresponding operations according to the contact person's information and the related data of the position. The system comprises a server and a client, wherein the server comprises an intermediate platform and the client comprises a first platform and a second platform. The invention reduces the complexity and development cost of the network platform and the mutual dependence and coupling degree of two interacting parties.

20 Claims, 5 Drawing Sheets

METHOD, SERVER, CLIENT AND SYSTEM FOR NETWORK PLATFORM INTERACTION

This is a non-provisional application claiming the benefit of International Application Number PCT/CN2011/070768 filed Jan. 28, 2011.

BACKGROUND OF THE INVENTION

1. Technical Field

The present invention relates to the technical field of communication, in particular, to a method, a server, a client and a system for network platform interaction.

2. Description of Related Art

The IM (Instant Messaging) platform is an internet-based, large-scaled, multi-person instant messaging platform. At the client of a user, the IM platform is usually required to interact with other local internet platforms. Other network platforms refer to any network platform involved in interaction with friends, e.g. the game platform, SNS (Social Networking Service) platform, or electronic commerce platform. Interaction includes a number of operations, e.g. inviting a friend on the IM platform to play games on the game platform, adding a game friend as a friend of the IM platform, or adding a friend of the IM platform as a game friend.

To realize interaction, the IM platform and the other internet platforms must acquire the related data of the opposite platform, such as the name, ID and address of friend, online or offline, game name, game ID, game category, community name, community ID, community category, etc, through certain ways. The above ways for acquiring the related data of the opposite platform may be either Com or pipeline communication technologies by which the IM platform and other internet platform can respectively acquire the data of the opposite platform and then execute corresponding operations.

In the prior art, as the local client of an initiator, when a user selects a friend on the IM platform and initiates interaction between the local IM platform and other local internet platforms, usually the local IM platform is required to acquire the data of the other local internet platforms and friend messages, and then communicate with the TM platform at the client of the friend to send an invitation; after receiving the acknowledgement from the IM platform at the client of the friend, the user can enter the other local internet platforms to execute corresponding operations.

For example, if user A wants to invite a friend user B to play a game together, user A shall select user B on user A's own IM platform, click the right key of a mouse on the head icon, select "play game together" and then select a concrete game name. At that time, the TM platform of user A sends an invitation message carrying the related data of user A and the related game data to the IM platform of user B; after receiving the invitation message on its own IM platform, if the user B clicks "accept", the IM platform of user B will send an acknowledgement to the IM platform of user A; if user A has not started the game platform at that time, the client thereof will automatically start the game platform; correspondingly, user B will accept the message about user A starting the game platform and then start the game platform at its own client; at this time, the game platform of user A can begin to interact with the game platform of user B, and user A and user B can play the game together.

The above prior art realizes the interaction between the local IM platform and the other local internet platforms but the IM platform needs an interface capable of communicating with other internet platform and acquiring the data message of other internet platforms; with the increased number of other internet platforms, the IM platform will become more and more enormous and complicated, and other internet platforms are also required to have the functions of acquiring the data of the IM platform, which makes software development more complicated. Therefore, the above prior art makes the platform realization between the two parties more complicated, strengthens the mutual dependence, and increases the coupling degree of the IM platform and other interne platforms.

BRIEF SUMMARY OF THE INVENTION

To solve the problems of the prior art, the present invention provides a method, a server, a client and a system for network platform interaction. The technical solution is as follows:

a method for network platform interaction comprises steps wherein:

an intermediate platform detects a location event, where the location event includes selecting a contact person on a first platform and moving the contact person to a certain position on a second platform;

the intermediate platform acquires the contact person's information from the first platform, determines the corresponding second platform according to the position, and sends the location event to the second platform;

and after receiving the location event, the second platform analyzes the location event to acquire the related data of the position, acquires the contact person's information from the intermediate platform, and executes corresponding operations according to the contact person's information and the related data of the position.

A system for network platform interaction comprises: a server and a client, wherein the server comprises an intermediate platform and the client comprises a first platform and a second platform;

the intermediate platform is used for detecting a location event, wherein the location event includes selecting a contact person on the first platform and moving the contact person to a certain position, on the second platform, and is also used for acquiring the information about the contact person from the first platform, determining the corresponding second platform according to the position, and sending the location event to the second platform;

the second platform is used for analyzing the location event that is received from the intermediate platform to acquire the related data of the position and acquiring the contact person's information from the intermediate platform, and executes corresponding operations according to the contact person's information and the related data of the position.

A server comprises an intermediate platform, wherein the intermediate platform is used for detecting a location event, wherein the location event includes selecting a contact person on the first platform and moving the contact person to a certain position on the second platform, and is also used for acquiring the information about the contact person from the first platform, determining the corresponding second platform according to the position and sending the location event to the second platform, so that the second platform analyzes the location event, acquires the related data of the position and the contact person's information from the intermediate platform, and executes corresponding operations according to the contact person's information and the related data of the position.

A client comprises a first platform and a second platform;

the second platform is used for receiving a location event, wherein the location event includes includes selecting a contact person on the first platform and moving the contact person to a certain position on the second platform, from an intermediate platform, analyzing the location event to acquire the related data of the position and acquiring the contact person's information from the intermediate platform, and executing corresponding operations according to the contact person's information and the related data of the position, the second platform corresponds to the position in the location event, and the contact person's information is acquired by the intermediate platform from the first platform.

The technical solutions provided by the present invention realize interaction between network platforms via the intermediate platform, e.g. interaction between the IM platform and the internet platform. According to the method, the first platform and the second platform are not required to have a communication interface for direct communication, e.g. the IM platform is not required to have an interface for communicating with the internet platform, and the internet platform is not required to directly communicate with the IM platform, etc., which greatly reduces the complexity and software development cost and effectively reduces the mutual dependence and coupling degree between the two parties. Moreover, the intermediate platform can be simply realized via the existing technology and is low in development cost. In addition, the intermediate platform is completely transparent relative to the first platform and the second platform, and the first platform and second platform are not required to care about or acquire the data of each other, so the interaction between the two platforms can be built quickly, and the interaction speed is greatly improved; meanwhile, great convenience is brought to the users, because it is simple to operate and easy to realize. Therefore, the users are provided with a more friendly interaction experience.

DETAILED DESCRIPTION OF THE INVENTION

To make the objective, technical solutions and advantages of the present invention more clear, the embodiments of the present invention will be further described in detail by combining the attached drawings.

Embodiment 1

Figure 1:
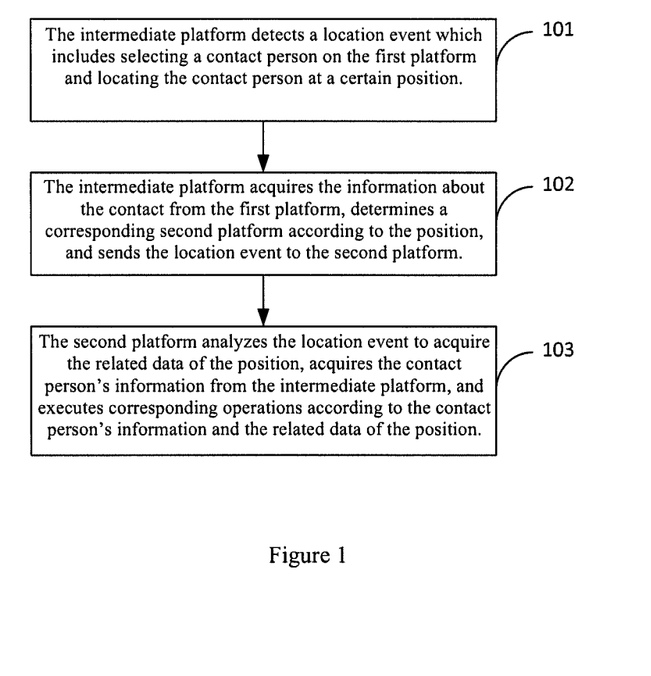
FIG. 1 is a flowchart of the method for network platform interaction in embodiment 1.

As shown in FIG. 1, this embodiment provides a method for network platform interaction, comprising steps wherein:

101: an intermediate platform detects a location event which includes selecting a contact person on a first platform and locating the contact person at a certain position;

102: the intermediate platform acquires the contact person's information from the first platform, determines the corresponding second platform according the position, and sends the detected location event to the second platform;

103: after receiving the location event, the second platform analyzes the location event to acquire the related data of the position, acquires the contact person's information from the intermediate platform, and executes corresponding operations according to the contact person's information and the related data of the position.

In this embodiment, the intermediate platform is positioned on the network side. It can be integrated in a single server or a server with other functions. The first platform and the second platform are positioned in the same client, which is a device on the user side, including, but not limited to: computer, notebook computer, mobile phone, etc., which are not concretely limited in this embodiment. The first platform is IM platform, and the second platform is internet platform; or the first platform is internet platform, and the second platform is IM platform. In this embodiment, one or many contact persons can be selected on the first platform.

In this embodiment, the IM platform refers to internet-based, large-scaled multi-person instant messaging platform, e.g. MSN, QQ, etc. The internet platform refers to the network platform involved in the interaction with the contact persons, for example, a game platform, SNS platform, electronic commerce platform, etc.

In this embodiment, the certain position where the selected contact person is located refers to a position in the second platform. The intermediate platform can learn the exact platform where the position is located according to the position.

After analyzing the received location event, the second platform can acquire the related data of the position. The related data includes, but is not limited to: name and ID of the platform where the position is located, the corresponding menu name and menu ID, etc. The corresponding operations executed by the second platform according to the contact person's information and the related data of the interaction include, but are not limited to: inviting a friend on the IM platform to play games on the game platform, adding a game friend as the friend of the IM platform, or adding a friend of the IM platform as the game friend.

The method provided by this embodiment realizes interaction between network platforms such as interaction between the IM platform and the internet platform via the intermediate platform. According to the method, the first platform and the second platform are not required to have a communication interface for direct communication, e.g. the IM platform is not required to have an interface for communicating with the internet platform, the internet platform is not required to directly communicate with the IM platform, etc., which greatly reduces the complexity and software development cost and effectively reduces the mutual dependence and coupling degree between the two parties. Moreover, the intermediate platform can be simply realized via the existing technology and is low in development cost. In addition, the intermediate platform is completely transparent relative to the first platform and the second platform, and the first platform and the second platform are not required to care about or acquire the data of each other; so the interaction between the two platforms can be built quickly, and the interaction speed is greatly improved; meanwhile, great convenience is brought to the users, because it is simple to operate and easy to realize. Therefore, the users are provided with a more friendly interaction experience.

Embodiment 2

Figure 2:
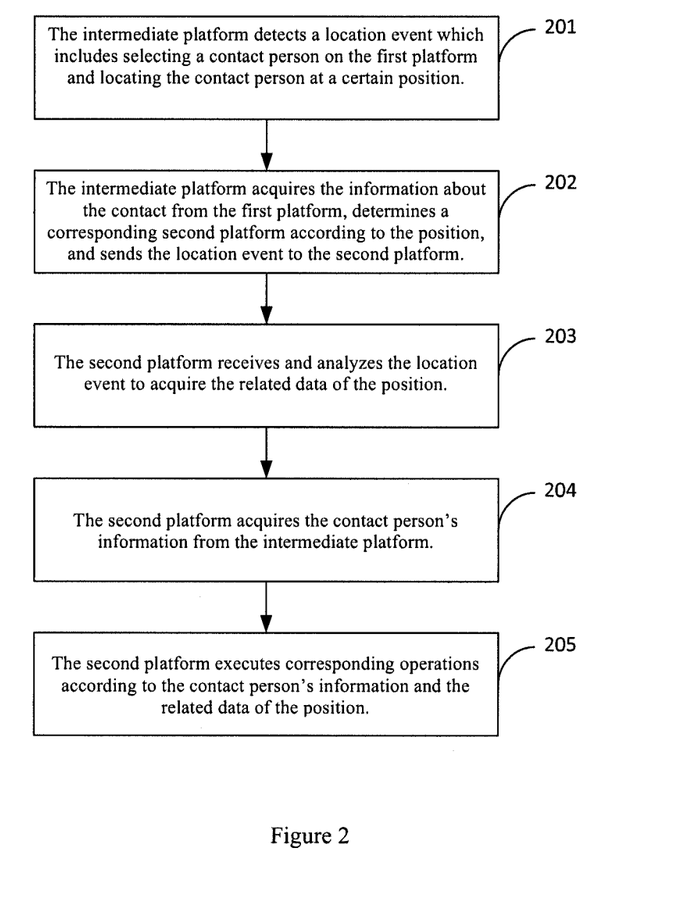
FIG. 2 is a flowchart of the method for network platform interaction in embodiment 2.

As shown in FIG. 2, this embodiment provides a method for network platform interaction, comprising steps wherein:

201: an intermediate platform detects a location event which includes selecting a contact person on a first platform and locating the contact person at a certain position;

wherein there may be one or many contact persons;

Specifically, the intermediate platform can detect the location event via an icon dragging technology, a manual touching and dragging technology, a speech analysis technology, or an eye-instrument sensing and locating technology; the icon dragging technology refers to clicking and dragging an icon from one platform to another platform, for example clicking and dragging a friend on the QQ platform to the QQ game platform; manual touching and dragging technology refers to clicking and dragging an icon by a finger from one platform to another platform, for example clicking and dragging a game friend to an MSN friend list on an iPhone by finger; speech analyzing technology refers to the technology that the initiating user speaking out the selected friend and the location target so that the intermediate platform can identify corresponding information according to the speech; the eye-instrument sensing and locating technology refers to the technology that the initiating user looking at the selected friend first and then looking at the target platform so that the intermediate platform can sense the friend information and the location event; any of above technologies can be selected to realize the technical solution, which is not specifically defined in this embodiment;

202: the intermediate platform acquires information about the contact person from the first platform, determines the corresponding second platform according the position, and sends the detected location event to the second platform;

in this embodiment, the first platform and the second platform are located in the same client, and specifically, the first platform is IM platform, and the second platform is internet platform, or the first platform is internet platform, and the second platform is IM platform;

203: the second platform receives the location event sent from the intermediate platform and analyzes the location event to acquire the related data of the position, wherein, the second platform can acquire the related data of the position by analyzing the location event, and the analysis process varies with the location event; if the location event is an icon dragging location, the second platform will analyze the current position of a mouse to acquire the related data of the position; if the location event is a manual touching and dragging location, the second platform will analyze the current position touched by the finger to acquire the related data of the position; if the location event is a speech analyzing location, the second platform will identify the current position broadcasted in the speech content to acquire the related data of the position; and if the location event is an eye-instrument sensing and locating location, the second platform will analyze the current position where the human eyes looks to acquire the related data of the position; in which related data acquired by the second platform includes, but is not limited to: name and ID of the platform where the position is located, the corresponding menu name and menu ID, etc., which are not specifically defined in this embodiment; for example, the second platform analyzes the current position of the mouse, and acquires the position is in the QQ game lobby, the game category belongs to chess game, the game name is Chinese chess, the room number, the table number, etc.;

204: the second platform acquires the contact person's information from the intermediate platform;

specifically, the second platform can read the contact person's information from the intermediate platform;

or the intermediate platform sends the contact person's information to the second platform first and then the second platform receives the contact person's information sent from the intermediate platform;

205: the second platform executes corresponding operations according to the acquired contact person's information and the related data of the position, the flow ends, Wherein corresponding operations include, but are not limited to: inviting a friend on the IM platform to play games on the game platform, adding a game friend as the friend of the IM platform, or adding a friend of the IM platform as the game friend.

Figure 3:
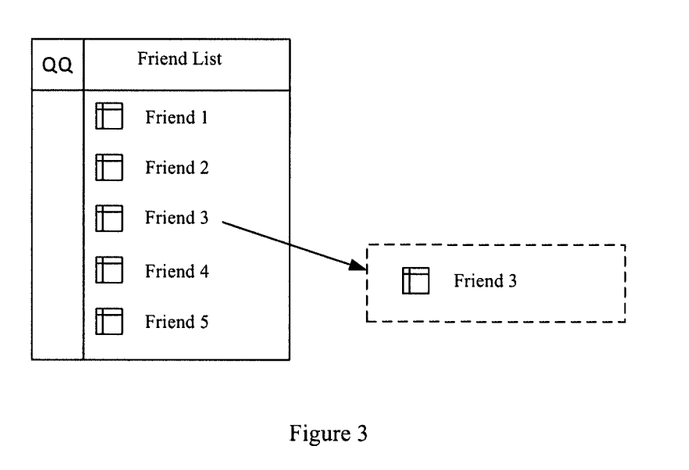
FIG. 3 is a schematic view wherein the user drags friend icons from the IM platform in embodiment 2.
Figure 4:
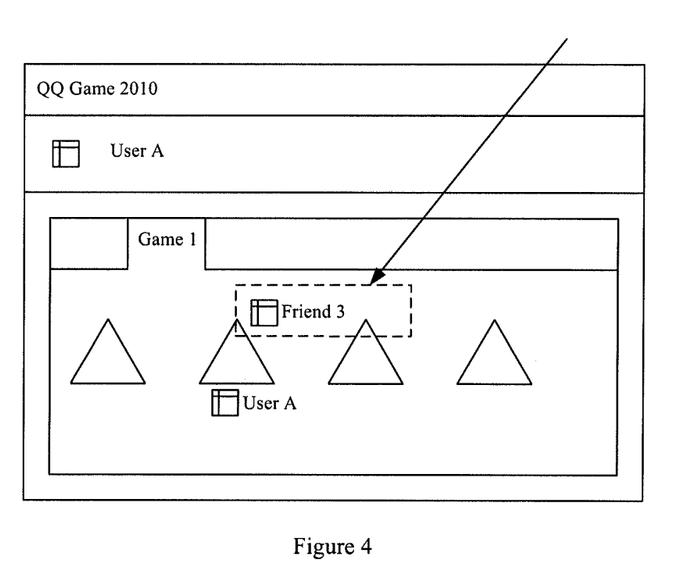
FIG. 4 is a schematic view wherein the user drags friend icons from the IM platform into a game of a game platform in embodiment 2.
Figure 5:
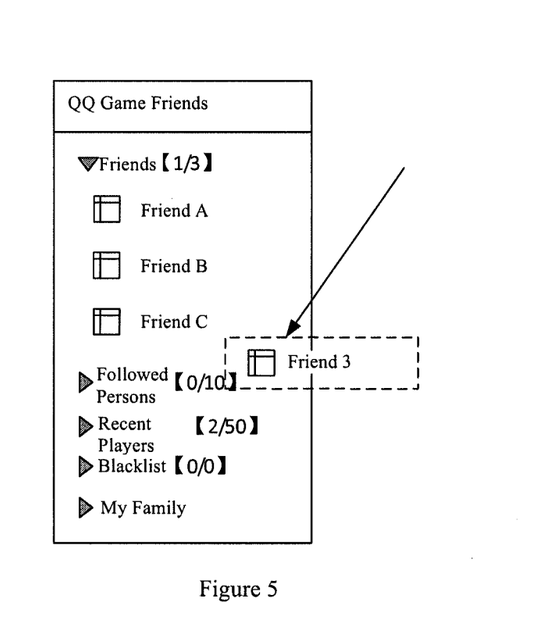
FIG. 5 is a schematic view wherein the user drags friend icons from the IM platform into a list of the game platform in embodiment 2.

For example, as shown in FIGS. 3 and 4, the intermediate platform detects the location event: user A selects and drags a friend 3 from the friend list of the QQ platform to a certain position in the game lobby of the QQ game platform, and the intermediate platform acquires the information of friend 3, determines the corresponding platform as the QQ game platform according to the position and sends the detected location event to the QQ game platform; next, the QQ game platform receives and analyzes the location events, acquires the related data of the position, including the information of the game lobby, the game name, the game ID, etc., acquires the information about friend 3 from the intermediate platform, and executes the operation such as user A invites friend 3 to play a game together according to the information of friend 3 and the related data of the position. For another example, as shown in FIGS. 3 and 5, the intermediate platform detects the location event: user A selects and drags a friend 3 from the friend list of the QQ platform to a "followed persons" list of the QQ game platform, then the intermediate platform acquires the information of friend 3, determines the corresponding platform as the QQ game platform according to the position, and sends the detected location event to the QQ game platform of user A; next, the QQ game platform receives and analyzes the location events, acquires the related data of the position, including the number of persons in the "followed persons" list of the QQ game platform, the online status etc., acquires the information about friend 3 from the intermediate platform, and executes the operation which user A adds friend 3 into the "followed persons" list of the QQ game according to the information of friend 3 and the related data of the position. As shown in FIGS. 3, 4 and 5, when the IM platform and the internet platform is interacting, the operation is simple, flexible, convenient and easy to realize, so the interaction effect can be achieved quickly.

To make the platform identify the received information conveniently, when the intermediate platform actively sends the contact person's information to the second platform of the initiator, the method may further comprise:

the intermediate platform adds the identifier corresponding to the second platform for the acquired contact person's information and sends the identifier together with the contact person's information to the second platform, correspondingly; the second platform receives the above contact person's information and identifier, judges whether the identifier corresponds to the second platform, and if so, executes corresponding operations according to the acquired contact person's information and the related data of the position; otherwise, it executes no operation and can discard the contact person's information, the identifier and the related data of the position, and then the flow ends;

wherein, the identifier is preset, can be negotiated by the intermediate platform and the second platform, or set by one of the two parties and notified to the other, and the identifier corresponds to the second platform so the corresponding second platform can be determined according to the identifier; when the client has a plurality of second platforms, any two of the second platforms can correspond to one identifier, or different identifiers. For example, the second platform of the client includes 4 internet platforms; two of them can be set to correspond to identifier 1 and the other two correspond to identifier 2, and the four internet platforms also can be respectively set to correspond to identifier 1, identifier 2, identifier 3, identifier 4, etc.

Besides, the contents of above mentioned identifiers are not limited and can be defined to be any form, such as letters, numbers, character strings, etc.; moreover, when the identifier is sent to the second platform together with the contact person's information, the position relation between the identifier and the contact person's information is also not limited and can be defined according to demands, for example using the identifier as the prefix or postfix of the contact person's information, as long as the intermediate platform and the second platform can identify the identifier. This embodiment has no concrete definition in this aspect.

Figure 6:
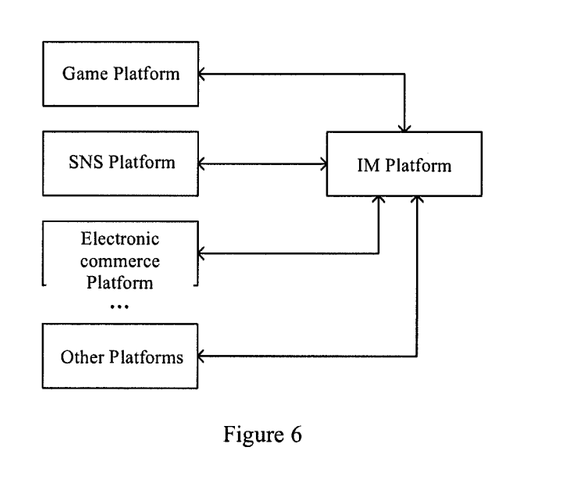
FIG. 6 is a schematic view of interaction between the existing IM platform and the internet platform.
Figure 7:
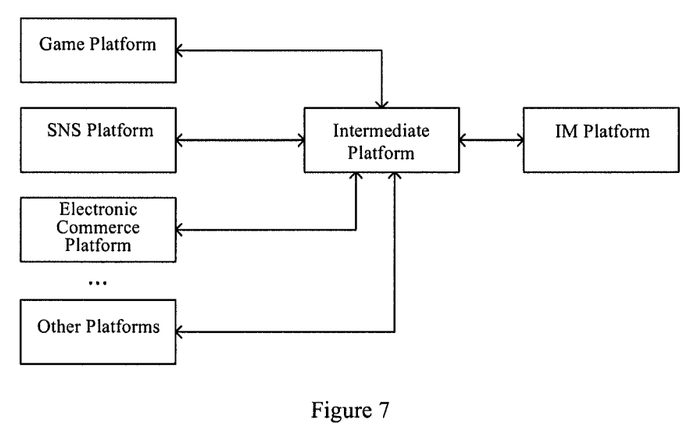
FIG. 7 is a schematic view of interaction between the IM platform and the internet platform via the intermediate platform in embodiment 2.

The method provided by this embodiment realizes interaction between network platforms such as interaction between the IM platform and the internet platform via the intermediate platform. According to the method, the first platform and the second platform are not required to have a communication interface for direct communication, e.g. the IM platform is not required to have an interface for communicating with the internet platform, the internet platform is not required to directly communicate with the IM platform, etc., which greatly reduces the complexity and software development cost and effectively reduces the mutual dependence and coupling degree between the two parties. See FIGS. 6 and 7, FIG. 6 is a schematic view of interaction between the IM platform and the internet platform in the prior art, which approves the high dependence and high coupling between the internet platform and the IM platform; FIG. 7 is a schematic view of interaction between the IM platform and the internet platform via the intermediate platform in this embodiment, which shows that only the intermediate platform depends on the IM platform and that other internet platforms are independent on the IM platform.

According to the method provided above this embodiment, the intermediate platform can be simply realized via existing technology and is low in development cost. In addition, the intermediate platform is completely transparent relative to the first platform and the second platform, and the first platform and the second platform are not required to care about or acquire the data of each other, so the interaction between the two platforms can be built quickly, and the interaction speed is greatly improved; meanwhile, great convenience is brought to the users, because it is simple to operate and easy to realize. Therefore, the users are provided with a more friendly interaction experience.

Embodiment 3

Figure 8:
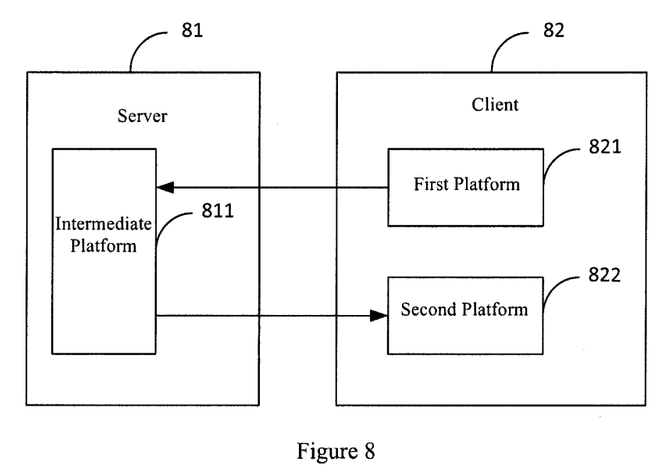
FIG. 8 is a systematic view of the system for network platform interaction in embodiment 3.

As shown in FIG. 8, this embodiment provides a system for network platform interaction, comprising a server 81 and a client 82, wherein the server 81 comprises an intermediate platform 811 and the client 82 comprises a first platform 821 and a second platform 822;

the intermediate platform 811 is used for detecting a location event which includes the client 82 selecting a contact person on the first platform 821 and locating the contact person at a certain position, also used for acquiring the contact person's information from the first platform 821, determining a corresponding second platform 822 according to the position, and sending the location event to the second platform 822;

the second platform 822 is used for receiving the location event, analyzing the location event to acquire the related data of the position, acquiring the contact person's information from the intermediate platform 811, and executing corresponding operations according to the contact person's information and the related data of the position.

In this embodiment, the intermediate platform 811 in the first realization mode may comprise:

a detection module for detecting the location event via an icon dragging technology, a manual touching and dragging technology, a speech analysis technology, or an eye-instrument sensing and locating technology, wherein the location event means selecting a contact person on the first platform 821 and locating the contact person at a certain position.

In this embodiment, the second platform 822 in the second realization mode may comprise:

a contact person's information acquisition module for reading the contact person's information from the intermediate platform 811.

In this embodiment, the intermediate platform 811 in the third realization mode may comprise:

a contact person's information-sending module for sending the contact person's information to the second platform 822; correspondingly, the second platform 822 shall comprise:

a contact person's information-receiving module for receiving the contact person's information from the intermediate platform 811.

In this embodiment, the intermediate platform 811 based on third realization mode may further comprise:

An identifier-adding module for adding an identifier corresponding to the second platform 822 for the contact person's information; the contact person's information-sending module is further used for sending the identifier added by the identifier-adding module together with the contact person's information to the second platform 822;

correspondingly, the contact person's information-receiving module of the second platform 822 is further used for receiving the identifier sent from the intermediate platform 811; the second platform 822 further comprises:

a judging module for judging whether the identifier received by the contact person's information-receiving module corresponds to the second platform 822, and if so, triggering the second platform 822 to execute corresponding operations according to the contact person's information and the related data of the position.

Based on any realization mode in this embodiment, the first platform 821 is IM platform, and the second platform 822 is internet platform; or the first platform 821 is internet platform, while the second platform 822 is IM platform. There may be one or many contact persons.

The server provided by this embodiment is a device on the network side, which may be a single server or other server with the functions of the intermediate platform and other functions. The server can realize the methods in embodiments 1 and 2, with the process as described in the above embodiments.

The system by this embodiment realizes interaction between the first platform and the second platform via the intermediate platform of the server, e.g. the interaction between the IM platform and the interne platform. According to the method, the first platform and the second platform are not required to have a communication interface for direct communication, which greatly reduces the complexity and software development cost and effectively reduces the mutual dependence and coupling degree between the two parties. Moreover, the intermediate platform can be simply realized via the existing technology and is low in development cost. In addition, the intermediate platform is completely transparent relative to the first and second platforms, and the first platform and the second platform are not required to care about or acquire the data of each other, so the interaction between the two platforms can be built quickly, and the interaction speed is greatly improved; meanwhile, great convenience is brought to the users, because it is simple to operate and easy to realize. Therefore, the users are provided with a more friendly interaction experience.

Embodiment 4

This embodiment provides a server, comprising an intermediate platform;

the intermediate platform is used for detecting a location event which includes selecting a contact person on the first platform of the client and locating the contact person at a certain position and is also used for acquiring the contact person's information from the first platform, determining a corresponding second platform according to the position, and sending the location event to the second platform, so that the second platform analyzes the location event, acquires the related data of the position and the contact person's information from the intermediate platform, and executes corresponding operations according to the contact person's information and the related data of the position.

In this embodiment, the intermediate platform may comprise:

a detection module for detecting the location event via an icon dragging technology, a manual touching and dragging technology, a speech analysis technology, or an eye-instrument sensing and locating technology, wherein the location event means selecting a contact person on the first platform and locating the contact person at a certain position.

In this embodiment, the intermediate platform may comprise:

a contact person's information-sending module for sending the contact person's information to the second platform.

In this embodiment, the intermediate platform may further comprise:

an identifier-adding module for adding an identifier corresponding to the second platform for the contact person's information; correspondingly, the contact person's information-sending module is further used for sending the identifier added by the identifier-adding module, together with the contact person's information, to the second platform so that the second platform can judge whether the identifier corresponds to the second platform, and if so, trigger the second platform to execute corresponding operations according to the contact person's information and the related data of the position.

The server by this embodiment realizes interaction between the first platform and the second platform via the intermediate platform of the server, e.g. the interaction between the IM platform and the internet platform. According to the method, the first platform and the second platform are not required to have a communication interface for direct communication, which greatly reduces the complexity and software development cost and effectively reduces the mutual dependence and coupling degree between the two parties. Moreover, the intermediate platform can be simply realized via the existing technology and is low in development cost. In addition, the intermediate platform is completely transparent relative to the first platform and the second platform, and the first platform and the second platform are not required to care about or acquire the data of each other, so the interaction between the two platforms can be built quickly, and the interaction speed is greatly improved; meanwhile, great convenience is brought to the users, because it is simple to operate and easy to realize. Therefore, the users are provided with a more friendly interaction experience.

Embodiment 5

This embodiment provides a client, comprising a first platform and a second platform;

the second platform is used for receiving a location event which includes selecting a contact person on the first platform and locating the contact person at a certain position, from an intermediate platform, analyzing the location event to acquire the related data of the position, acquiring the contact person's information from the intermediate platform, and executing corresponding operations according to the contact person's information and the related data of the position, wherein, the second platform corresponds to the position in the location event and the contact person's information is acquired by the intermediate platform from the first platform.

In this embodiment, the second platform may comprise:

a contact person's information acquisition module for reading the contact person's information from the intermediate platform.

In this embodiment, the second platform may comprise:

a contact person's information-receiving module for receiving the contact person's information from the intermediate platform.

Furthermore, the contact person's information-receiving module is further used for: receiving an identifier corresponding to the second platform, wherein the identifier is sent from the intermediate platform and added for the contact person's information; correspondingly, the second platform further comprises:

a judging module for judging whether the identifier received by the contact person's information-receiving module corresponds to the second platform, and if so, triggering the second platform to execute corresponding operations according to the contact person's information and the related data of the position.

In this embodiment, the first platform is IM platform, and the second platform is internet platform; or the first platform is internet platform, and the second platform is IM platform.

The server by this embodiment realizes interaction between the first platform and the second platform via the intermediate platform of the server, e.g. the interaction between the IM platform and the internet platform. According to the method, the first platform and the second platform are not required to have a communication interface for direct communication, which greatly reduces the complexity and software development cost and effectively reduces the mutual dependence and coupling degree between the two parties. Moreover, the intermediate platform can be simply realized via the existing technology and is low in development cost. In addition, the intermediate platform is completely transparent relative to the first platform and the second platform, and the first platform and the second platform are not required to care about or acquire the data of each other, so the interaction between the two platforms can be built quickly, and the interaction speed is greatly improved; meanwhile, great convenience is brought to the users, because it is simple to operate and easy to realize. Therefore, the users are provided with a more friendly interaction experience.

Finally, it should be explained that: persons of ordinary skill in the art are able to understand that all or part of the flows of the methods in the above embodiments can be completed by related hardware under the instructions of computer programs, and the programs are capable of being stored in the readable memory medium of a computer and may include the flows of all methods in the above embodiments, wherein the memory medium may be a disk, an optical disk, a read-only memory (ROM), a random access memory (RAM), etc.

In this embodiment, all functional units are capable of being integrated in one processing module, or each of the units exists individually, or two or more than two units are integrated in one module. The integrated module may be realized in the format of a hardware or software functional module. In case of being realized in the software functional module, the integrated module can be sold or used as an individual product and also can be stored in the readable memory medium of a computer. The above memory medium may be a read-only memory, disk, optical disk, etc. All above devices or systems are capable of executing the method in the corresponding embodiments.

The above descriptions are only preferable embodiments of the present invention, which shall not limit the present invention. Any amendment, equivalent replacement, improvement, etc. within the spirit and principle of the present invention shall be included in the protection scope of the present invention.

What is claimed is:

1. A method for network platform interaction, wherein said method comprises:
   an intermediate platform detects a location event, wherein the location event includes selecting a contact person on a first platform and moving the contact person to a certain position on a second platform;
   the intermediate platform acquires the contact person's information from the first platform, determines the second platform according to the position, and sends the location event to the second platform;
   and after receiving the location event, the second platform analyzes the location event to acquire the related data of the position, acquires the contact person's information from the intermediate platform, and executes corresponding operations according to the contact person's information and the related data of the position.

2. The method according to claim 1, the step wherein acquires the contact person's information from the intermediate platform comprises:
   the second platform reads the contact person's information from the intermediate platform;
   or steps wherein:
   the intermediate platform sends the contact person's information to the second platform;
   and the second platform receives the contact person's information sent from the intermediate platform.

3. The method according to claim 2, the step wherein the intermediate platform sends the contact person's information to the second platform further comprises:
   the intermediate platform adds an identifier corresponding to the second platform for the contact person's information and sends the identifier together with the contact person's information to the second platform;
   the step wherein the second platform receives the contact person's information sent from the intermediate platform and executes corresponding operations according to the contact person's information and the related data of the position comprises a step wherein:
   the second platform receives the contact person's information and the identifier sent from the intermediate platform, judges whether the identifier corresponds to the second platform, and if so, executes corresponding operations according to the contact person's information and the related data of the position.

4. The method according to claim 1, the step wherein an intermediate platform detects the location event comprises:
   the intermediate platform detects the location event via an icon dragging technology, a manual touching and dragging technology, a speech analysis technology, or an eye-instrument sensing and locating technology.

5. The method according to claim 1, wherein: the first platform is an instant messaging (IM) platform, and the second platform is an internet platform; or the first platform is an internet platform, and the second platform is an IM platform.

6. system for network platform interaction, wherein said system comprises: a server and a client, wherein the server comprises an intermediate platform and the client comprises a first platform and a second platform;
   the intermediate platform is used for detecting a location event, wherein the location event includes selecting a contact person on the first platform and moving the contact person to a certain position on the second platform, and is also used for acquiring the information about the contact person from the first platform, determining the corresponding second platform according to the position, and sending the location event to the second platform;
   the second platform is used for analyzing the location event that is received from the intermediate platform to acquire the related data of the position and acquiring the contact person's information from the intermediate platform, and executing corresponding operations according to the contact person's information and the related data of the position.

7. The system according to claim 6, wherein the intermediate platform comprises:
   a detection module for detecting the location event via an icon dragging technology, a manual touching and dragging technology, a speech analysis technology, or an eye-instrument sensing and locating technology, wherein the location event means selecting a contact person on the first platform and locating the contact person at a certain position.

8. The system according to claim 6, wherein the second platform comprises:
   a contact person's information acquisition module for reading the contact person's information from the intermediate platform.

9. The system according to claim 6, wherein the intermediate platform comprises:
   a contact person's information-sending module for sending the contact person's information to the second platform;
   the second platform comprises:
   a contact person's information-receiving module for receiving the contact person's information from the intermediate platform.

10. The system according to claim 9, wherein the intermediate platform further comprises:
    an identifier-adding module for adding the identifier corresponding to the second platform for the contact person's information;
    the contact person's information-sending module is further used for sending the identifier added by the identifier-adding module together with the contact person's information to the second platform;
    the contact person's information-receiving module of the second platform is further used for receiving the identifier sent from the intermediate platform;

the second platform further comprises:
a judging module for judging whether the identifier that is received by the contact person's information-receiving module corresponds to the second platform, and if so, triggering the second platform to execute corresponding operations according to the contact person's information and the related data of the position.

11. The system according to claim 6, wherein: the first platform is an instant messaging (IM) platform, and the second platform is an internet platform; or the first platform is an internet platform, and the second platform is an IM platform.

12. A server, wherein said server comprises an intermediate platform, wherein
the intermediate platform is used for detecting a location event, wherein the location event includes selecting a contact person on a first platform and moving the contact person to a certain position on a second platform, and is also used for acquiring the information about the contact person from the first platform, determining the corresponding second platform according to the position, and sending the location event to the second platform, so that the second platform analyzes the location event to acquire the related data of the position, acquires the contact person's information from the intermediate platform, and executes corresponding operations according to the contact person's information and the related data of the position.

13. The server according to claim 12, wherein the intermediate platform comprises:
a detection module for detecting the location event via an icon dragging technology, a manual touching and dragging technology, a speech analysis technology, or an eye-instrument sensing and locating technology, wherein the location event means selecting a contact person on the first platform and locating the contact person at a certain position.

14. The server according to claim 12, wherein the intermediate platform comprises:
a contact person's information-sending module for sending the contact person's information to the second platform.

15. The server according to claim 14, wherein the intermediate platform further comprises:
an identifier-adding module for adding the identifier corresponding to the second platform for the contact person's information;
the contact person's information-sending module is further used for sending the identifier that is added by the identifier-adding module together with the contact person's information to the second platform, so that the second platform can judge whether the identifier corresponds to the second platform, and if so, trigger the second platform to execute corresponding operations according to the contact person's information and the related data of the position.

16. A client, wherein said client comprises a first platform and a second platform, wherein
the second platform is used for receiving a location event, wherein the location event includes selecting a contact person on the first platform and moving the contact person to a certain position on the second platform, from an intermediate platform, analyzing the location event to acquire the related data of the position and acquiring the contact person's information from the intermediate platform, and executing corresponding operations according to the contact person's information and the related data of the position;
the second platform corresponds to the position in the location event, and the contact person's information is acquired by the intermediate platform from the first platform.

17. The client according to claim 16, wherein the second platform comprises:
a contact person's information acquisition module for reading the contact person's information from the intermediate platform.

18. The client according to claim 16, wherein the second platform comprises:
a contact person's information-receiving module for receiving the contact person's information from the intermediate platform.

19. The client according to claim 18, wherein the contact person's information-receiving module is further used for receiving an identifier corresponding to the second platform which is sent from the intermediate platform and added for the contact person's information;
the second platform further comprises:
a judging module for judging whether the identifier that is received by the contact person's information-receiving module corresponds to the second platform, and if so, triggering the second platform to execute corresponding operations according to the contact person's information and the related data of the position.

20. The client according to claim 16, wherein: the first platform is an instant messaging (IM) platform, and the second platform is an internet platform; or the first platform is an internet platform, and the second platform is an IM platform.

* * * * *

UNITED STATES PATENT AND TRADEMARK OFFICE
CERTIFICATE OF CORRECTION

PATENT NO.        : 8,676,910 B2
APPLICATION NO.   : 13/582048
DATED             : March 18, 2014
INVENTOR(S)       : Xuxin Wang, Dong Wang and Xianwen Chen

It is certified that error appears in the above-identified patent and that said Letters Patent is hereby corrected as shown below:

In the Claims

Column 12, Claim 6, line 13, please delete "system" and insert --The system--.

Column 13, Claim 11, lines 10-11, please delete "an platform" and insert --an internet platform--.

Signed and Sealed this
Fifth Day of May, 2015

Michelle K. Lee
*Director of the United States Patent and Trademark Office*